2,971,980
Patented Feb. 14, 1961

2,971,980

PREPARATION OF PARA-NITROBENZALDEHYDE AND PARA-NITROBENZOIC ACID

Samuel W. Tinsley, South Charleston, W. Va., assignor to Union Carbide Corporation, a corporation of New York No Drawing. Filed May 3, 1957, Ser. No. 656,752

4 Claims. (Cl. 260—515)

This invention relates to the preparation of para-nitrobenzaldehyde and para-nitrobenzoic acid. More particularly, this invention relates to the preparation of these products from para, beta-dinitrostyrene by the action of concentrated sulfuric acid, followed by hydrolysis of the resultant reaction mixture.

According to the present invention, I have now discovered a process wherein para-nitrobenzaldehyde and para-nitrobenozic acid can be prepared simultaneously and in controllable amounts from para, beta-dinitrostyrene. This is accomplished by a process which includes the steps of heating a mixture of the para, beta-dinitrostyrene in concentrated sulfuric acid to a temperature sufficient to cause the evolution of carbon monoxide, and thereafter diluting the reaction mixture with water and resolving the para-nitrobenzaldehyde and para-nitrobenzoic acid mixture, preferably by distillation.

Without desiring to be bound by any particular theory, it is my belief that at reaction temperatures sufficient to cause the evolution of carbon monoxide, the reactant, i.e., the para, beta-dinitrostyrene, under the influence of concentrated sulfuric acid at least partially hydrolyzes to nitrobenzaldehyde and nitromethane, the latter of which forms hydroxylamine and formic acid. The formic acid on being dehydrated by the hot sulfuric acid appears to be the source of the carbon monoxide evolved in the reaction. Other process reactions are quite complex and appear to involve recondensations of the hydroxylamine with either reactants or intermediate products.

After the evolution of carbon monoxide in this process is substantially complete, the mixture can then be hydrolyzed and resolved to recover the para-nitrobenzaldehyde and the para-nitrobenzoic acid from the hydrolysis residue, preferably by distillation. Under ideal reaction conditions, yields of each product of about 50 percent of theoretical are possible. Few unrecoverable by-products are produced in this process, achieving ultimate conversion efficiencies of the para, beta-dinitrostyrene approaching 100 percent.

In order to operate satisfactorily in this process, the sulfuric acid employed in the reaction must be concentrated, i.e. at least about 70 percent strength acid or more. Best yields of the para-nitrobenzaldehyde and para-nitrobenzoic acid are secured with commercial concentrated sulfuric acid (96 percent strength), although if desired, higher strength acid or oleum (20 percent $SO_3$) can be employed.

While the amount of sulfuric acid employed is not critically narrow, it should be present in amounts of at least 5 parts by weight per part of para, beta-dinitrostyrene. I have found it best to employ between about 8 parts to about 15 parts of acid per part of reactant, although the use of even greater amounts of acid can be employed if desired.

For purposes of this invention, it makes little difference if crystalline para, beta-dinitrostyrene is employed as the reactant or if it is prepared in situ from 1-(para-nitrophenyl)-ethyl nitrate by the action of concentrated sulfuric acid. When the para, beta-dinitrostyrene is employed as the reactant, it can be added directly to the sulfuric acid at room temperature and the mixture heated, or it can be slowly added to hot concentrated acid maintained at the desired reaction temperature. However, when the para, beta-dinitrostyrene is prepared in situ, it is necessary that it be done at a temperature below about 80° C. and preferably about 50° C. or less. In this in situ prepartion the concentrated sulfuric acid is heated to the desired reaction temperature and the 1-(para-nitrophenyl)-ethyl nitrate slowly added. The formation of the para, beta-dinitrostyrene is a highly exothermic reaction and care must be exercised in the addition of the 1-(para-nitrophenyl)-ethyl nitrate and the temperature controlled below about 80° C. until reaction is substantially complete. After that the reaction mixture of sulfuric acid and in situ prepared para, beta-dinitrostyrene is handled in the same manner as the directly prepared para, beta-dinitrostyrene and acid solution.

Initial evolution of carbon monoxide, I have found, can start at a temperature of about 80° C. Preferably, temperatures of about 100° C. to 120° C. are employed to hasten the reaction to completion within a relatively short period. However, it is desirable that the temperature be allowed to go no higher than about 150° C. to decrease any tendency of the products or intermediates to decompose. Preferably, temperatures between about 100° C. and about 120° C. should be maintained at least until the evolution of carbon monoxide has subsided.

After the reaction is substantially complete, the reaction mixture must be hydrolyzed and resolved into the two products. Hydrolysis of the mixture is accomplished at an elevated temperature, generally about the boiling point of water in the presence of a substantial excess of water. My preferred method for hydrolyzing and recovering the products is by steam distillation at atmospheric pressures. However, distillation at subatmospheric or superatmospheric pressures can also be employed. If desired, the products can be hydrolyzed by the addition to hot water and the resulting mixture distilled.

Distillation is the preferred method for resolving the hydrolyzed reaction mixture into the para-nitrobenzaldehyde and para-nitrobenzoic acid. The steam-volatile para-nitrobenzaldehyde is recovered from the distillate upon cooling and the higher boiling para-nitrobenzoic acid is recovered from the distillation residue. The para-nitrobenzaldehyde precipitates from the aqueous distillate after distillation and the para-nitrobenzoic acid crystallizes from the distillation residue when the para-nitro benzaldehyde is removed. The solid products are separated from their respective mixtures, viz. distillates or kettle residues, by suitable means, such as by filtration, centrifugation, or decantation. Preferably the solid products are washed with water and dried although such is not necessary to carry out the process of this invention. Generally the purity of the products recovered in this process will be above 90 percent and can be secured in a purity approaching 100 percent if care is exercised in the process.

I have found that the para, nitrobenzaldehyde and para-nitrobenzoic acid can be secured in the process in nearly equivalent amounts, about 50 percent of each product. Yields and total conversion are also correspondingly high, generally above 70 percent.

If conditions of reaction are any more severe than as shown in my illustrating examples, I have found the yield of the para-nitrobenzoic acid is as a direct result, increased and the yield of para-nitrobenzaldehyde decreased. This apparently is due to some oxidation of the aldehyde product to the acid and is not related to the reaction per se. For instance, at temperature of 130° C.–135° C. the yield of aldehyde can be decreased to only 28 percent, while the acid yield is increased. Likewise, when oleum containing 20 percent $SO_3$ is employed instead of 96 percent acid, the yield of aldehyde decreased to about 11 percent whereas the nitrobenzoic acid product amount to 68 percent.

My process can best be illustrated by the following examples.

Example 1

To 500 grams of 96 percent (concentrated) sulfuric acid maintained at 40° C. there was slowly added with stirring 50 grams of 1-(para-nitrophenyl)-ethyl nitrate over a period of 30 minutes. The temperature of the reaction mixture was maintained at about 40° C. during the addition. Stirring was continued for 5–10 minutes until all the ethyl nitrate had dissolved. Thereafter, the reaction mixture was poured onto ice and neutralized to a pH of about 7–8 with 28 percent ammonium hydroxide solution. A precipitate formed which was filtered from the solution and washed with water. The crystalline precipitate was dissolved in benzene and recrystallized from this solution to give 20 grams of a white crystalline matter identified as para, beta-dinitrostyrene, which had a melting point of 180° C.–200° C. This amounts to a yield of about 44 percent by weight of the theoretical. A second recrystallization of the para, beta-dinitrostyrene from benzene gave pure white crystals having a melting point of 200° C. The reported melting point of para, beta-dinitrostyrene is 196° C.–199° C. according to Ber., 32, 1293 (1899).

Twenty grams of the para, beta-dinitrostyrene prepared in a manner described above were slowly added to 200 grams of sulfuric acid (96 percent concentrated) maintained at 120° C. The slow addition of the para, beta-dinitrostyrene consumed five minutes, during which the sulfuric acid mixture was stirred. The temperature was maintained between 120° C.–125° C. during the addition by cooling with an ice water bath. Stirring was continued for an additional two minutes to complete the evolution of carbon monoxide from the mixture. The resultant solution was then rapidly cooled in an ice bath to 40° C. and the contents of the flask poured into one liter of ice water in a flask equipped for steam distillation. The hydrolyzed mixture in the steam distillation flask was distilled and 5 grams of para-nitrobenzaldehyde were recovered from the distillate. This amounted to a yield of about 32 percent. The para-nitrobenzoic acid remained in the distillation residue which could be recovered by crystallization.

Example 2

Para, beta-dinitrostyrene was prepared in situ by slowly adding 50 grams of 1-(para-nitrophenyl) ethyl nitrate to 500 grams of 96 percent (concentrated) sulfuric acid maintained at 40° C. over a period of 30 minutes. After all the nitrate had dissolved in the sulfuric acid, the temperature was slowly raised to about 100° C., in about 60 minutes, to cause the para, beta-dinitrostyrene to be reacted to the para-nitrobenzaldehyde and para-nitrobenzoic acid. At this temperature there was a noticeable evolution of a gas identified as carbon monoxide and an apparently exothermic reaction occurred raising the temperature to 120° C. The reaction subsided in about 10 minutes and the reaction mixture was maintained at 110° C. for 15 minutes then cooled to about 50° C. and slowly poured onto 1000 grams of ice.

The resultant aqueous mixture was distilled by heating in a glass vessel equipped with a water-cooled condenser and a collecting flask for removal of the distillate. The kettle mixture was maintained at atmospheric pressure during the distillation. The distillate was removed and a white crystalline solid appeared in the distillate collecting flask. This was filtered, dried, and identified as para-nitrobenzaldehyde, which had a melting point of 102° C. The yield was 49 percent of theoretical. The remainder of the distillate was water.

After all the para-nitrobenzaldehyde had been distilled over, the kettle contents were allowed to cool to 25° C. where crystallization in the kettle solution occurred. The formed crystals were filtered, washed with water, and dried. The 10 grams of crystals were recovered and identified as para-nitrobenzoic acid, melting at 235° C.–237° C. This amounted to a yield of about 25 percent to para-nitrobenzoic acid.

Example 3

Para, beta-dinitrostyrene was prepared in situ by slowly adding 50 grams of 1-(para-nitrophenyl)-ethyl nitrate to 500 grams of 96 percent (concentrated) sulfuric acid maintained at 40° C. over a period of 30 minutes. The mixture was then slowly heated to about 110° C. over a period of 20 minutes to cause the para, beta-dinitrostyrene to react. At about 110° C. there was a noticeable evolution of carbon monoxide and an apparently exothermic reaction occurred which caused the temperature of the reaction mixture to rise to about 117° C. This temperature rise subsided in about 10 minutes, after the reaction mixture was cooled to 100° C. and maintained at this temperature for about 15 minutes, and then cooled to about 25° C.

The cooled reaction mixture was then slowly added over a period of about 120 minutes to a two-liter flask containing boiling water while introducing steam at the same time. The steam distillation flask was connected to a water-cooled condenser and a distillate collecting flask. Steam distillation was continued for about five hours during which a white crystalline solid formed in the distillate. After no additional solid collected in the distillate, steam was turned off and the unit allowed to cool. The white precipitate in the distillate was filtered, washed with water, and dried, yielding 15 grams of para-nitrobenzaldehyde melting at 100° C.–103° C. This represents a yield of about 41 percent of para-nitrobenzaldehyde.

The crystals in the residue in the kettle of the steam distillation were filtered, washed with water, and dried, yielding 14 grams of para-nitrobenzoic acid melting at 233° C.–236° C. This represents a yield of 35 percent to para-nitrobenzoic acid.

I claim:

1. A process for the simultaneous preparation of para-nitrobenzaldehyde and para-nitrobenzoic acid which includes the steps of heating a solution of para, beta-dinitrostyrene and concentrated sulfuric acid of a strength of at least 70 percent, said mixture containing at least five parts by weight of sulfuric acid per part of para, beta-dinitrostyrene to a temperature at least sufficient to initiate the evolution of carbon monoxide and after such evolution is substantially complete, admixing the reaction mixture with sufficient water to hydrolyze the said mixture and recovering the para-nitrobenzaldehyde and para-nitrobenzoic acid thus produced.

2. A process for the simultaneous preparation of para-nitrobenzaldehyde and para-nitrobenzoic acid which includes the steps of heating a solution of para, beta-dinitrostyrene and concentrated sulfuric acid containing at least 5 parts of sulfuric acid per part of para, beta-dinitrostyrene to a temperature sufficient to cause the evolution of carbon monoxide from the said solution but below the decomposition temperature of the products, and after the said evolution is substantially complete, hydrolyzing the resultant solution with water and distilling the so formed mixture to recover the para-nitrobenzaldehyde from the distillate and para-nitrobenzoic acid from the residue.

3. A process for the simultaneous preparation of para-nitrobenzaldehyde and para-nitrobenzoic acid which includes the steps of heating a solution of para, beta-dinitrostyrene and concentrated sulfuric acid containing at least 5 parts of sulfuric acid per part of para, beta-dinitrostyrene to a temperature between about 80° C. and about 150° C. to cause the evolution of carbon monoxide, and after the said evolution is substantially complete, hydrolyzing the resultant solution with water and distilling the so formed mixture to recover the para-nitrobenzaldehyde from the distillate and para-nitrobenzoic acid from the residue.

4. A process for the simultaneous preparation of para-nitrobenzaldehyde and para-nitrobenzoic acid which includes the steps of heating a solution of para, beta-dinitrostyrene and concentrated sulfuric acid containing at least 5 parts of sulfuric acid per part of para, beta-dinitrostyrene to a temperature between about 100° C. and 120° C. to cause the evolution of carbon monoxide, and after the said evolution is substantially complete, hydrolyzing the resultant solution with water and distilling the so formed mixture to recover the para-nitrobenzaldehyde from the distillate and para-nitrobenzoic acid from the residue.

References Cited in the file of this patent

Grant: Hackh's Chemical Dictionary, page 423 (1944).
Degering: An Outline of Organic Nitrogen Compounds, page 75 (1945).
Canonica et al.: Chem. Absts. 44, page 2949 (1950).
Rodd: Chemistry of Carbon Compounds, IIIB, page 959 (1956).